No. 634,266. Patented Oct. 3, 1899.
J. MONIGHAN & H. BRAINARD.
PIANO STRING WINDING MACHINE.
(Application filed Nov. 30, 1898.)
(No Model.) 4 Sheets—Sheet 1.
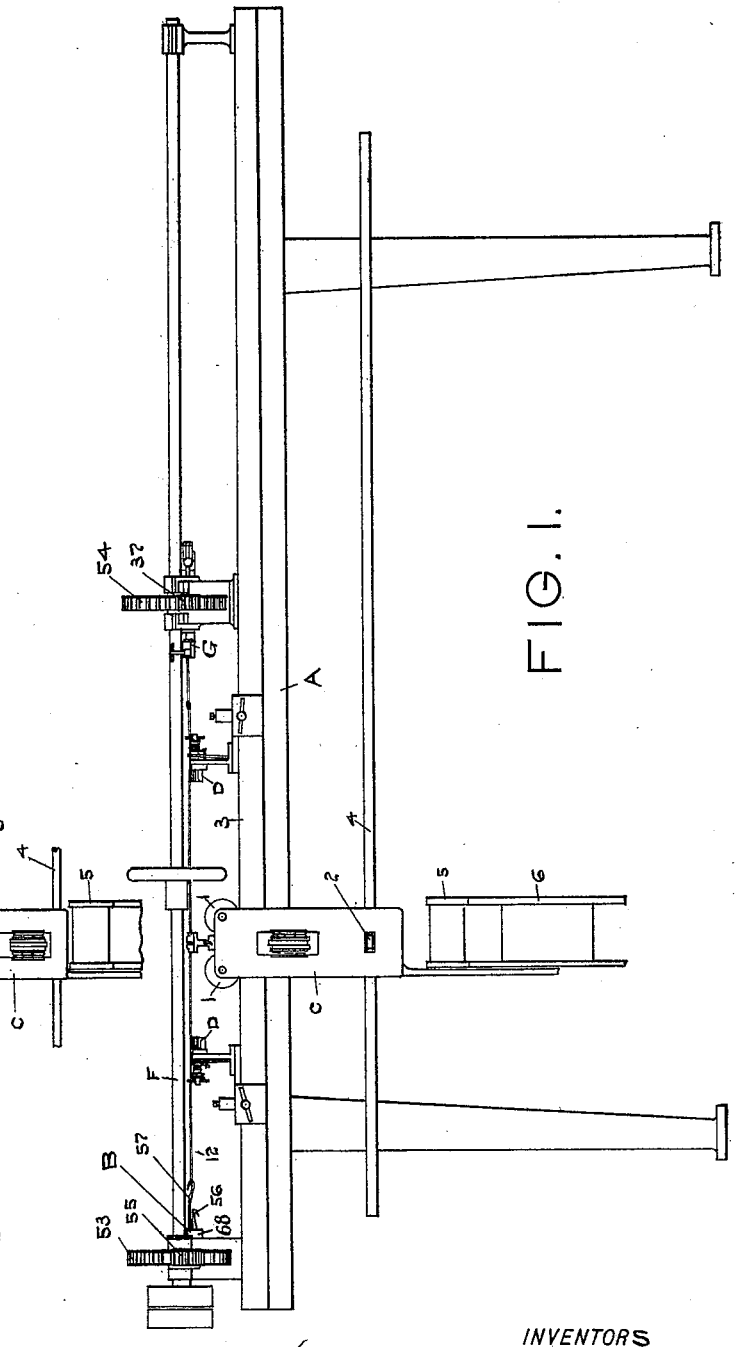
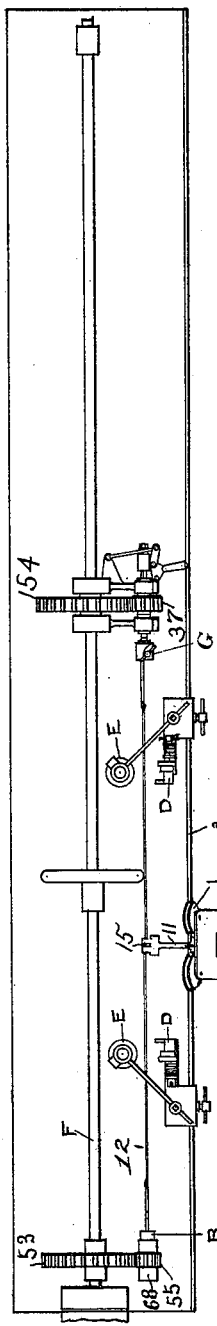
WITNESSES:
INVENTORS
John Monighan and Henry Brainard
BY
their ATTORNEY.

No. 634,266. Patented Oct. 3, 1899.
J. MONIGHAN & H. BRAINARD.
PIANO STRING WINDING MACHINE.
(Application filed Nov. 30, 1898.)
(No Model.) 4 Sheets—Sheet 2.
FIG. 3.
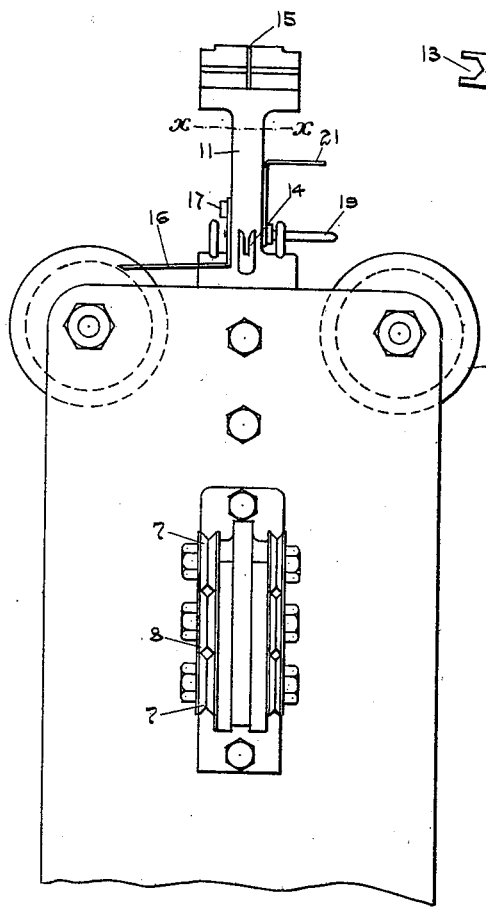
FIG. 4.
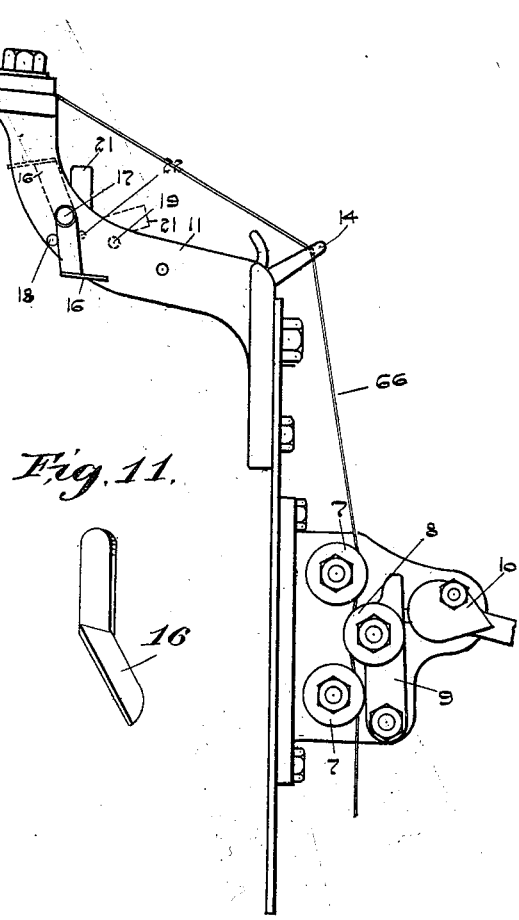
Fig. 11.
WITNESSES:
INVENTORS
John Monighan and Henry Brainard,
BY
their ATTORNEY.

No. 634,266. Patented Oct. 3, 1899.
J. MONIGHAN & H. BRAINARD.
PIANO STRING WINDING MACHINE.
(Application filed Nov. 30, 1898.)
(No Model.) 4 Sheets—Sheet 3.

WITNESSES:

INVENTORS.
John Monighan and Henry Brainard,
BY
their ATTORNEY.

No. 634,266. Patented Oct. 3, 1899.
J. MONIGHAN & H. BRAINARD.
PIANO STRING WINDING MACHINE.
(Application filed Nov. 30, 1898.)
(No Model.) 4 Sheets—Sheet 4.
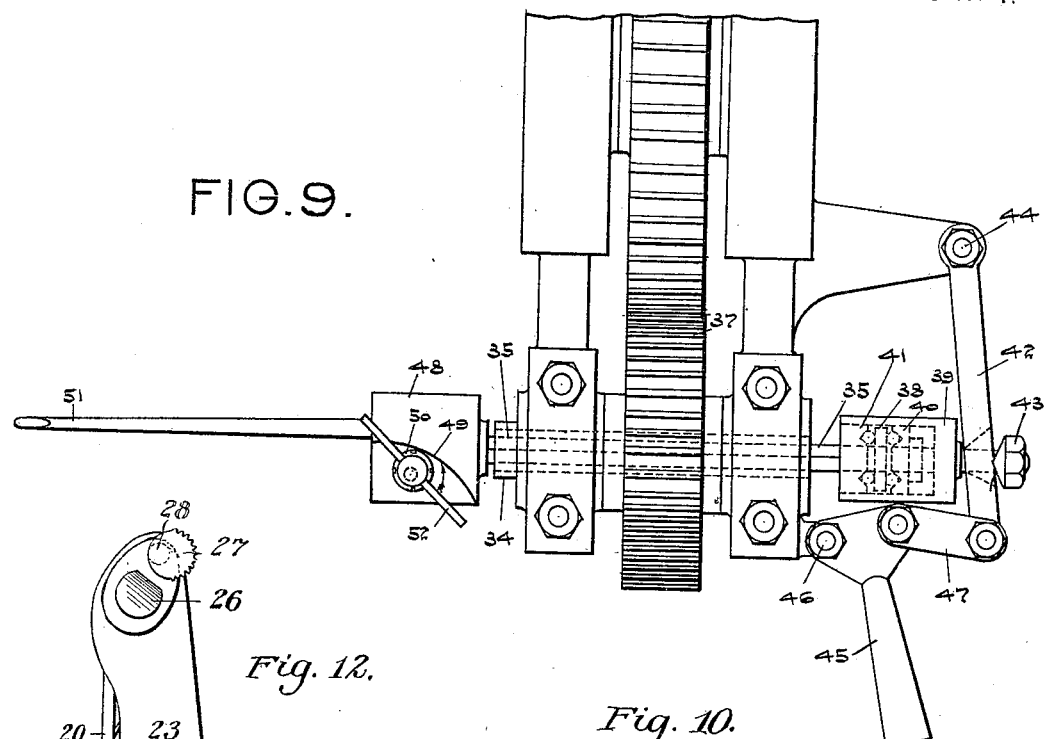
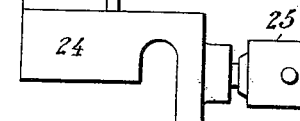
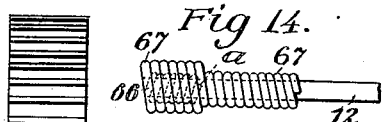
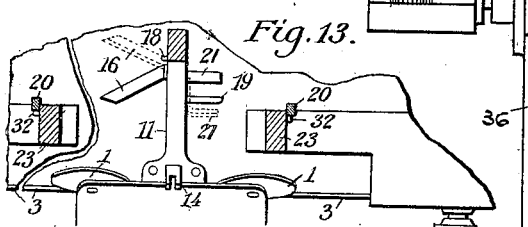
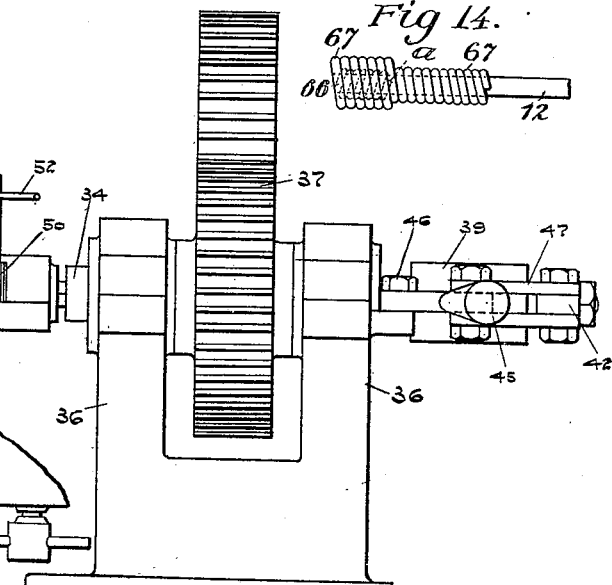
WITNESSES:
INVENTORS
John Monighan and Henry Brainard
BY
their ATTORNEY.
THE NORRIS PETERS CO., PHOTO-LITHO., WASHINGTON, D. C.

UNITED STATES PATENT OFFICE.

JOHN MONIGHAN AND HENRY BRAINARD, OF CHICAGO, ILLINOIS; SAID BRAINARD ASSIGNOR TO SAID MONIGHAN.

PIANO-STRING-WINDING MACHINE.

SPECIFICATION forming part of Letters Patent No. 634,266, dated October 3, 1899.

Application filed November 30, 1898. Serial No. 697,847. (No model.)

*To all whom it may concern:*

Be it known that we, JOHN MONIGHAN and HENRY BRAINARD, citizens of the United States of America, and residents of Chicago, in the county of Cook and State of Illinois, have invented certain new and useful Improvements in Piano-String-Winding Machines, of which the following is a specification.

Our invention relates to machines for winding or covering piano-strings.

The main objects of our invention are to save the time of the operator by providing a more convenient arrangement of parts than has been used heretofore, to provide for accurate adjustment and thereby insure uniformity of the strings, to provide for readily flattening the main wire at the proper places with reference to the ends of the wind or wrap of the covering-wire, to prevent a waste of the main wire or wire to be covered at its tuning end by providing improved fastening means instead of the hooks around which it has heretofore been necessary to twist said end, and to insure a uniform tension on the main wires during the process of covering same.

The purpose and operation of the different parts shown will be understood from the following description by reference to the accompanying drawings, in which—

Figure 7:
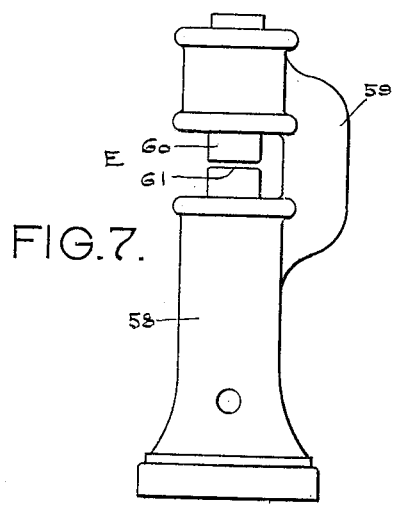
Figure 5:
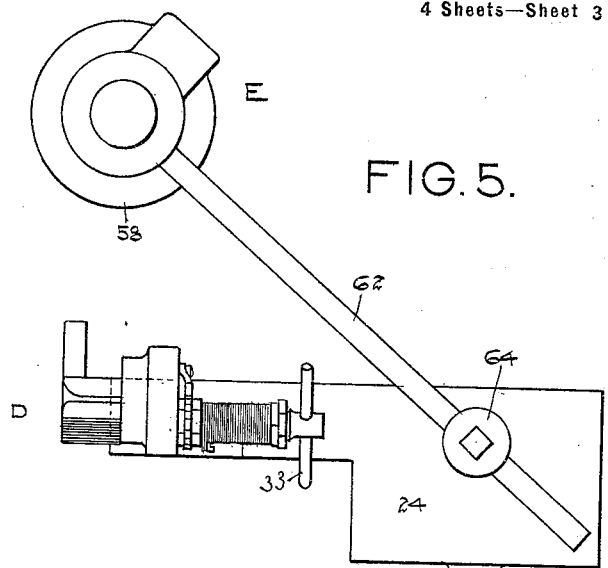
Figure 8:
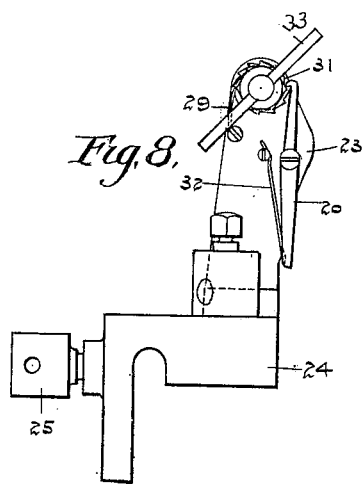
Figure 6:
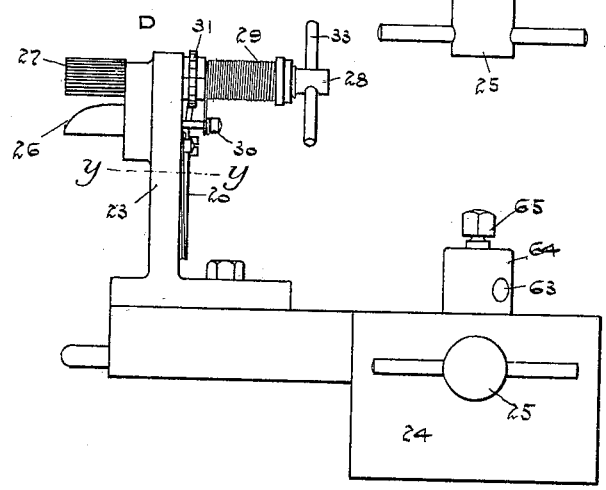

Figure 1 is a front elevation of a machine constructed according to our invention. Fig. 2 is a top plan of same. Fig. 3 is a front elevation of part of the carriage for supporting and guiding the covering-wire. Fig. 4 is a side elevation of same. Fig. 5 is a top plan of the gripping mechanism for stopping the covering-wire and the device for flattening the main wire, with the block supporting same. Fig. 6 is a front elevation of same, omitting the flattening device. Fig. 7 is a side-elevation of the flattening device. Fig. 8 is a side elevation of the parts shown in Fig. 6. Fig. 9 is a top plan of the mechanism for engaging the tuning end of the main wire and stretching same. Fig. 10 is a front elevation of same. Fig. 11 is a perspective view of the projection 16. Fig. 12 is a side elevation of one of the grips D, taken from the side on which the jaws 26 and 27 are located. Fig. 13 is a top plan, partly sectional and partly broken away, showing the relative positions of the projections 16 and 19 and the catches 20 on the standards 23, the arm 11 being in section on the line $x\ x$ of Fig. 3 and the standards 23 and catches 20 being in section on the line $y\ y$ of Fig. 8. Fig. 14 shows part of a wire toward the left end, indicating how the outer wind 67 passes over the end at $a$ of the inner wind 66.

The device shown consists, mainly, of the frame A, having thereon the live-spindles B G for supporting and revolving the main wire; the carriage C for supporting and guiding the covering-wire, movable on the frame longitudinal of the main wire; the grips D for engaging and stopping the feed of the covering-wire, the same being adjustable longitudinal of the frame to determine the limits of the covering on the main wire; the flattening devices E, which are longitudinally adjustable with the grips, so that the flattening will be at the proper places corresponding to the ends of the covering, and the driving-shaft F and gearing for revolving the spindles. The carriage C has rollers 1 2 journaled thereon, which carry same on the tracks 3 4 of the frame. Spools 5 6 for carrying different sizes of covering-wire are revolubly supported on the lower part of the carriage. Above the spools and secured to the carriage is a wire-straightener comprising the interacting rollers 7 and 8, the latter being journaled in an arm 9, which is depressed by the lever 10. The arm 11 is secured to the upper part of the carriage, extends in close proximity to the main wire 12, and has a recess 13 therein, through which the wire 12 passes. The covering-wire passes from its spool through the straightener, the slotted guide-piece 14, and the slot 15 to the main wire. A projection 16 is pivoted to the arm 11 at 17 and stopped by the lug 18 in the position shown in full lines. A projection 19 is rigid on the opposite side of the arm 11. The office of the projections 16 and 19 is to release the catches 20 on the grips D, hereinafter described. The projections 16 and 19 are beveled at their free ends for sliding contact with the catches 20. A stop 21 is pivoted to the member 11 at 22. When this is turned down to the position shown by dotted lines, its free end is in position to abut the standard 23 of the grip D at the right, so as to fix a position of the carriage inward or toward the left, Figs. 1 and 2, of the position at which the projection 19 would operate on the catch 20. The object of fixing this inward position is to start the inner wind of a double covering to the left of the place where the outer wind will be stopped on the return of the carriage, so that the outer wind will extend over the end of the inner wind, forming a single wind for a short distance beyond said end. The grips D are supported on blocks 24, which are slidingly mounted on the frame A, and are adjusted in a fixed position on the frame by the screws 25.

The grips D each consist of a standard 23, supporting the fixed jaw 26, and the eccentric jaw 27 is rigidly secured to the arm 28, which is journaled in the standard 23. A spring 29 is secured at one end to the arm 28 and at the other end to a pin 30 on the standard 23. A ratchet-wheel 31 is rigid on the arm 28 and is engaged by the stop 20 through the action of the spring 32. To fix the jaw 27 out of operative position, the operator turns the arm 28 against the action of the spring 29 by means of the handle 33. The catch 20 then engages the ratchet-wheel 31 and holds the jaw 27 in such position. When the carriage C moves toward one of the grips, the covering-wire is carried between the jaws 26 and 27. One of the projections 16 or 19 then coming in contact with the lower arm of the adjacent catch 20 depresses same, and thereby releases the jaw 27, which engages the covering-wire, and immediately stops the feed of same. The lower ends of the catches 20 project beyond the standards 23, and the projections 16 and 19 are beveled at their ends, so that they will cam against the catches 20 during the motion of the carriage, and thus release the ratchet-wheels 31.

The spindle B has rigidly mounted thereon a pair of hooks 56 and 57, one for engaging the looped end of the main wire 12 and the other for securing the end of the covering-wire preparatory to winding same upon the main wire. The spindle B is journaled in the standard 68 of the frame.

The spindle G consists, mainly, of a longitudinally-movable shaft 35, having thereon jaws for engaging the tuning end of the main wire. The shaft 35 extends through the shaft 34, is angular in cross-section, has longitudinal movement in the shaft 34, and is revoluble with same. The shaft 34 is journaled in the member 36 of the frame and has the gear-wheel 37 rigidly mounted thereon. The shaft 35 has a shoulder 38 toward the outer end in the sleeve or casing 39. Cones or collars 40 and 41 are secured within the casing, providing bearings for the shoulder 38 to prevent the relative longitudinal movement of the casing 39 and shaft 35. The casing 39 has an extension thereon passing through a slot in the arm 42 and terminating in the head 43. The arm 42 is pivoted to the frame at 44. A lever 45 is pivoted to the frame at 46. The arm 42 and lever 45 are pivotally connected by the link 47. When the lever is in the position shown, the spindle is locked against inward longitudinal movement, the point of its pivotal connection with the link bearing against the casing 39. By pulling the lever toward the left the casing 39 will be urged inwardly or toward the left, carrying the shaft 35 with same.

The head 48 has a fixed jaw or shoulder 49 thereon, an eccentric jaw 50 pivoted thereto, and a hook 51 for attachment of the covering-wire. The eccentric 50 is turned into and out of engagement with the main wire by the handle 52.

The spindles are driven by the shaft F through the gear-wheels 53 and 54 meshing with the gear-wheels 55 and 37, respectively.

The flattening device consists of an anvil 58, having an arm 59 supporting a plunger 60 above the striking-face 61 of the anvil. The anvil is secured to the arm 62, which passes through an orifice 63 in the block 64 and is secured by the set-screw 65. The block 64 is pivoted to the block 24, so that the anvil has a radial movement with its arm 62.

The operation of the machine is as follows: The operator first hooks the looped end of the main wire upon the hook 56 of the left-hand spindle and then draws the wire tight between the jaws 49 and 50 and turns the jaw 50 in the direction of the arrow (see Fig. 9) into engagement with the wire, the spindle G being at the inner limit of its longitudinal movement. The lever 45 is then thrown back, thus tightening the wire and locking the spindle G at the outer limit of its longitudinal movement. The flatteners E are then turned into proper position on their pivotal connection at 64, being pulled forward to a position at which the main wire passes between the striking-face 61 and the plunger 60. The operator then strikes the plunger 60 with a hammer, thereby flattening the wire at the place of contact of the plungers, and then pushes the flatteners back free from the wire. To make a single wind-covering, the carriage is first placed at the left of the frame, the wind of the covering-wire being started at the flattened part of the main wire near that end, and the end of the covering-wire being secured to the hook 57. The spindles are then revolved, turning the main wire and winding the covering-wire. The carriage is moved toward the right through the action of the covering-wire until the projection 19 comes in contact with the catch 20, whereby the jaw 27 is released, so that same grips the covering-wire, causing same to break at the main wire. To make a double-wind covering, the stop 21 is first turned down to the position shown by dotted lines in Fig. 4. The carriage is then brought into a position with the stop 21 abutting the standard 23 of the grip D at the right. The wind of the covering-wire is now started at that position, the end of said covering-wire being secured on the hook 51. When the carriage arrives at a point near the grip D on the left, the projection 16 releases the catch 20 at that end and there stops and breaks the covering-wire. The projection 16 is then turned up to the position shown by the dotted lines in Figs. 4 and 13, permitting the carriage to be moved a short distance further to the left, the projection 16 when in such position being out of the way of the standard 23 and catch 20 thereon. The second covering-wire, which is supported on the lower spool, is then brought into proper position and wound from a point at the left of the first covering-wire, over same and to a point at the right of the starting-point of the first covering-wire, the stop 21 being turned up so that the second wire is broken at the proper place through the operation of the stop 19 and the grip D at the right.

It will be understood that the details of construction of our device may be altered in many ways without departing from the spirit of our invention.

What we claim as our invention, and desire to secure by Letters Patent, is—

1. A piano-string-winding machine, comprising a supporting-frame; mechanism thereon for engaging and revolving the main wire; a carriage for guiding and feeding the covering-wire along said main wire; and a grip on said frame, separate from the carriage, located at one end of the travel of said carriage, and adapted to engage the covering-wire and stop the feed of same.

2. A piano-string-winding machine, comprising a supporting-frame; mechanism thereon for engaging and rovolving the main wire; a carriage for guiding and feeding the covering-wire along said main wire; a grip on said frame separate from the carriage, located at one end of the travel of said carriage and adapted to engage the covering-wire and stop the feed of same; and mechanism for automatically operating the grip when the carriage arrives at said end of its travel.

3. A piano-string-winding machine, comprising a supporting-frame; mechanism thereon for engaging and revolving the main wire; a carriage for guiding and feeding the covering-wire along said main wire; and a grip located at each end of the travel of the carriage, separate from the carriage, and adapted to engage the covering-wire and stop the feed of same.

4. A piano-string-winding machine, comprising a supporting-frame; mechanism thereon for engaging and revolving the main wire; a carriage for guiding and feeding the covering-wire along said main wire; a grip located at each end of the travel of the carriage, separate from the carriage, and adapted to engage the covering-wire and stop the feed of same; and mechanism for automatically operating the adjacent grip when the carriage arrives at either end of its travel.

5. A piano-string-winding machine, comprising a supporting-frame; mechanism thereon for engaging and revolving the main wire; a carriage for guiding and feeding the covering-wire along said main wire; a grip located at each end of the travel of the carriage, separate from the carriage, and adapted to engage the covering-wire, and stop the feed of same; a catch on each grip for holding same out of engagement; and projections on the carriage for releasing said catches; one of said projections being movable out of operative position, to permit the movement of the carriage to a position along said main wire outward of the position at which said movable projection is operative.

6. A piano-string-winding machine, comprising a supporting-frame; mechanism thereon for engaging and revolving the main wire; a carriage for guiding and feeding the covering-wire along said main wire; a grip located at each end of the travel of the carriage, separate from the carriage, and adapted to engage the covering-wire, and stop the feed of same; a catch on each grip for holding same out of engagement; the projection 19, secured to one side of the carriage; the movable stop 21, on said side; and the movable projection 16 secured to the other side of the carriage; substantially as and for the purposes specified.

7. A piano-string-winding machine, comprising a supporting-frame; mechanism thereon for engaging and revolving the main wire; a carriage for guiding and feeding the covering-wire along said main wire; a block adjustable on said frame longitudinal of said main wire, independent of the carriage, and having thereon a grip adapted to engage the covering-wire to stop the feed of same; and a device for flattening the main wire, carried by said block, and operative on the main wire at a fixed place with reference to the point at which said feed is stopped; substantially as described.

8. A piano-string-winding machine, comprising a supporting-frame; mechanism thereon for engaging and revolving the main wire; mechanism for carrying and feeding the covering-wire; and an anvil adjustable on said frame longitudinal of the main wire and having an arm carrying a plunger operative toward the striking-surface of the anvil, substantially as described.

9. A piano-string-winding machine, comprising a supporting-frame; mechanism thereon for engaging and revolving the main wire; mechanism for carrying and feeding the covering-wire; a block, adjustable on said frame longitudinal of the main wire; and a device for flattening the main wire, secured to said block and having a limited movement thereon to and from a predetermined point on said main wire.

10. A piano-string-winding machine, comprising a supporting-frame; mechanism thereon for carrying and feeding the covering-wire; a pair of live-spindles for supporting and revolving the main wire; one of said spindles having thereon mechanism for engaging the looped end of said main wire and the other spindle being longitudinally movable, and having thereon a fixed jaw and a coöperating eccentric jaw for engaging the tuning end of said main wire; mechanism for urging said movable spindle outwardly when said jaws are in engagement; and mechanism for uniformly revolving said spindles.

11. A piano-string-winding machine, comprising a supporting-frame; mechanism thereon for carrying and feeding the covering-wire; a pair of live-spindles for supporting and revolving the main wire; one of said spindles having thereon mechanism for engaging the looped end of said main wire; and the other spindle being longitudinally movable and having thereon a fixed jaw and a coöperating eccentric jaw for engaging the tuning end of said main wire; mechanism for urging said movable spindle outwardly when said jaws are in engagement, and locking same in such outward position; and mechanism for uniformly revolving said spindles.

Signed by us at Chicago, Illinois, this 12th day of November, 1898.

JOHN MONIGHAN.
HENRY BRAINARD.

Witnesses:
WM. R. RUMMLER,
LUCY M. FARRELL.